May 5, 1942.  E. M. CLAYTOR  2,281,916

OVERDRIVE CONTROL SYSTEM

Filed Sept. 19, 1940

INVENTOR
Edward M. Claytor
BY
Spencer Hardman & Fehr
his ATTORNEYS

Patented May 5, 1942

2,281,916

UNITED STATES PATENT OFFICE 2,281,916

OVERDRIVE CONTROL SYSTEM

Edward M. Claytor, Anderson, Ind., assignor to General Motors Corporation, Detroit, Mich., a corporation of Delaware Application September 19, 1940, Serial No. 357,454

11 Claims. (Cl. 192—3)

This invention relates to electrical systems for controlling overdrives on automobiles. In systems now in use, the rendering of overdrive operative is dependent upon two factors: (1) attainment of a certain vehicle speed (2) reduction of engine speed below equivalent vehicle speed. A switch automatically closes in response to a vehicle speed of 25 M. P. H., for example, to precondition the overdrive control for going into overdrive. When the accelerator pedal is released to permit engine speed to be reduced a predetermined percentage below vehicle speed, the overdrive becomes automatically operative. Coming out of overdrive is effected by the opening of a driver operated switch. For this purpose a switch is caused to open by the depressing of the throttle pedal a little beyond wide open throttle position. Partial raising of the throttle pedal will permit the throttle switch to close again and an additional raising of the pedal when done quickly, will restore the overdrive. At speeds below the closing speed of the vehicle-speed-responsive switch or governor switch, the driver has no control of the overdrive. He can not maintain the overdrive operative at relatively low vehicle speeds even though it might be desirable to do so.

An object of the invention is to provide a system of overdrive control by which the overdrive may become operative when the vehicle speed attains a certain value, for example, 25 M. P. H., but by which the overdrive will remain operative although the vehicle speed may fall to a relatively low value, for example, 9 M. P. H., and by which the overdrive may be rendered inoperative if the driver so desires. Such a system can be used advantageously when the vehicle is moving slowly down a steep grade and the engine is being used as a brake. The engine will be more effective to brake the vehicle speed if the transmission is in overdrive at low vehicle speeds. In present overdrive systems the car "free-wheels" when not in overdrive, even for any forward gear setting. The present invention therefore provides means for avoiding the "free-wheeling" status of the vehicle at low speeds so that the engine may be used as a brake.

Further objects and advantages of the present invention will be apparent from the following description, reference being had to the accompanying drawing wherein preferred embodiments of the present invention are clearly shown.

Figure 1:
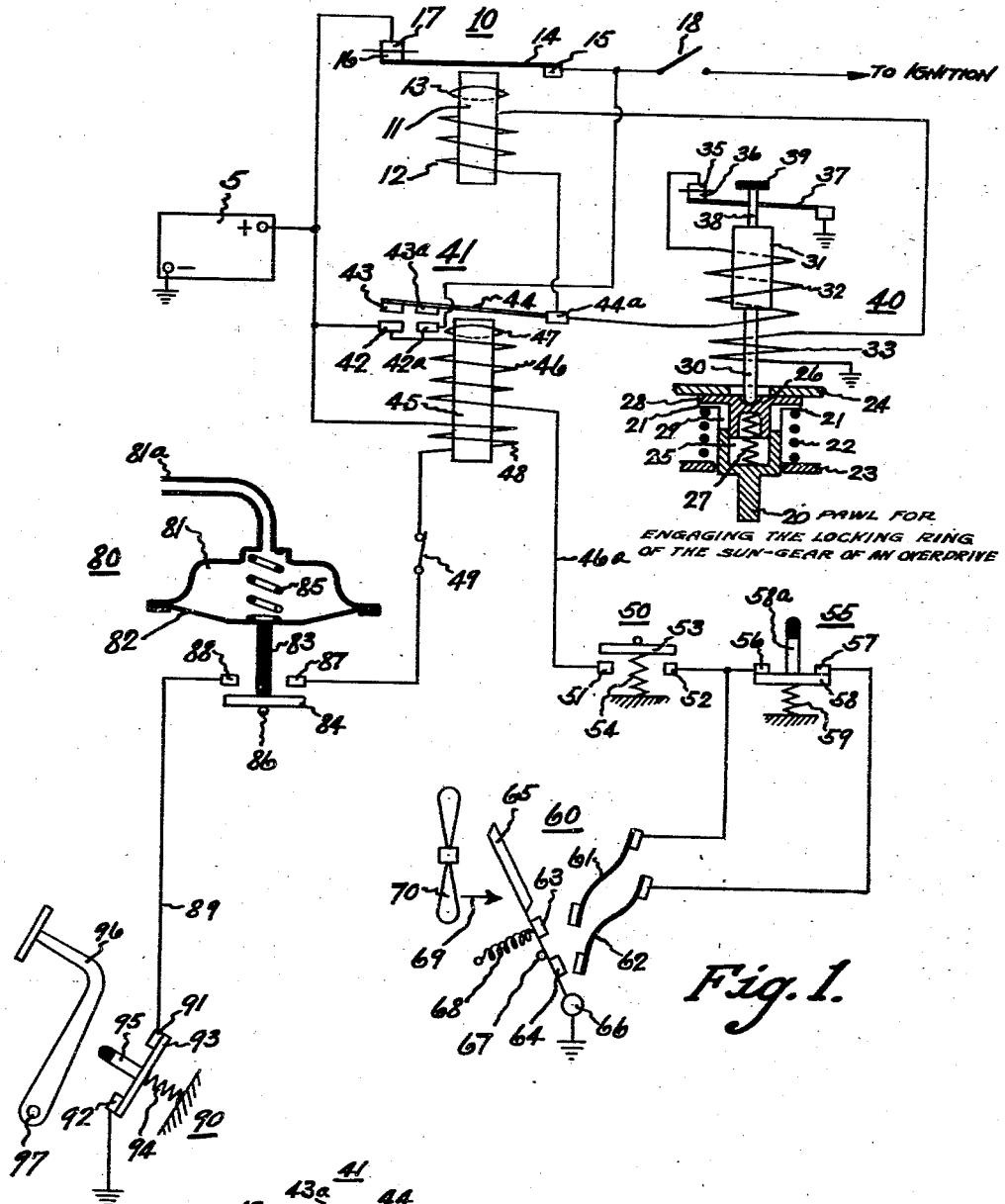
Fig. 1 is a wiring diagram illustrating an embodiment of the present invention.

While the present invention is not restricted to the control of any particular type of overdrive, I have chosen to disclose my invention in connection with the type of overdrive in which a pawl 20 is urged under spring pressure by the operation of a solenoid 40 into locking engagement with the locking ring of the overdrive sungear. Pawl 20 has lugs 21 engaged by a spring 22 bearing against a fixed part 23 so that the pawl 20 is normally urged against a fixed part 24 and out of engagement with a sun-gear locking ring (not shown). The central recess 25 in the tubular upper part of pawl 20 receives a button 26 and a spring 27. Button 26 has lugs 28 received by notches 29 in pawl 20. Lugs 28 are engaged by springs 22 which hold the button 26 up against the fixed part 24. Spring 27 yieldingly transmits downward movement of button 26 to pawl 20.

Downward movement of button 26 is effected by a rod 30 resting upon button 26 and supporting a solenoid armature 31 in the magnetic field of armature attracting coil 32 and armature holding coil 33. Coil 33 is directly grounded. Coil 32 is connected with ground through a normally closed switch having a fixed contact 35 and a movable contact 36 on a grounded, resilient blade 37. Blade 37 has a hole through which there extends a rod 38 carrying a head 39 normally spaced above blade 37. When the armature 31 has been attracted downwardly a certain distance toward a fixed core (not shown) by the combined effect of both coils 32 and 33, when energized, the blade 37 will be moved by the head 39 downwardly to separate contacts 35, 36 thereby open-circuiting coil 32. Holding coil 33 is operative to maintain the armature 31 in attracted position.

Downward movement of button 26 causes the pawl 20 to be urged downwardly to effect its engagement with the sungear locking ring (not shown) thereby rendering the overdrive operative. Open circuiting the coil 33 by means to be described, permits spring 22 to retract pawl 20 thereby causing the overdrive to become inoperative. The coming out of overdrive is facilitated by momentarily rendering the engine ignition inoperative by the functioning of a measured time relay 10 having a core 11 within an armature attracting coil 12 in series with holding coil 33 of solenoid 40, and within a damper coil 13. The core 11 has a chromium plated end against which the armature 14 seals when attracted to the core. Armature 14, connected with terminal 15 and ignition switch 18, carries a contact 16 normally engaging contact 17 connected with battery 5.

The coils 32 and 33 of solenoid 40 and the coil 12 of time relay 10 are controlled by relay 41 having a terminal 44a common to armature 44, coil 32, and series connected coils 12 and 33. Armature 44 carries contacts 43 and 43a engageable respectively with contacts 42 and 42a. Contacts 42 and 43 make a connection with battery 5. Contacts 42a and 43a make a connection with ignition switch 18 independent of contacts 16 and 17 of relay 10.

Battery 5 is connected with an armature attracting coil 46 surrounding a core 45 and connected with a gear switch 50 by wire 46a. Battery 5 is connected with an armature holding coil 48 connected with a manually operated switch 49 and with an engine-intake-vacuum responsive switch 80. Coil 48 is ineffective, when energized, to attract armature 45 unaided by coil 46; but coil 48 will maintain armature 45 in circuit closing position unaided by coil 46.

When relay 41 is closed, solenoid 40 is operative to urge the pawl 20 into contact with the sun gear locking member, and relay 10 is operative to open the contacts 16 and 17. However, the relay 41 by-passes these contacts by closing contacts 42a and 43a so that the ignition remains connected with battery 5 while relay 41 is closed. Following the opening of relay 41, solenoid 40 and relay 10 are deenergized and the ignition is interrupted due to the opening of contacts 42a and 43a and is not resumed again until contacts 16 and 17 of relay 10 close. The reclosing of contacts 16 and 17 is delayed due to the delay in releasing armature 14 for a measured time interval following the opening of relay 41. Hence there is an appreciable time (on the order of .1 second) during which the engine is "dead" so that retraction of the pawl 20 from the sun-gear locking member by spring 22 is facilitated.

Relay 41 has a time delay feature on dropping out. Its armature 44 will be separated from its core 45, when sealed, by a thin chromium plating. Core 45 is surrounded by a short circuited damper coil 47. The predetermined time delay, on the order of .25 second will give a smoother acceleration from speeds below 15 M. P. H., with car in overdrive at the time the throttle is opened. Contacts 43 and 43a are resiliently mounted on armature 44.

The explanation is found in the fact that the engine must pick up 30 percent speed to catch up with the freewheeling car speed before positive drive relation between engine and car is established. At the time when the engine catches up with the car, a forward urge, resembling a bump, is felt. This bump is less severe when the car is moving relatively fast than when moving slowly. Therefore, if the engine is allowed to give a partial increase in speed to the car while it is yet in overdrive, there will be two steps of acceleration to a given car speed instead of one. One period of acceleration will occur from the time the throttle is opened until the beginning of the "dead engine" period. The "dead engine" period begins when relay 41 opens. The other acceleration period begins at the instant the engine catches up with the car speed. The time delay results in a faster car speed when the fast acceleration begins, thus minimizing the bump or sudden forward urge.

Switch 50 comprises contacts 51 and 52 normally unbridged by contact 53 held up by a spring 54. Switch 50 is closed when certain of the regular transmission gear trains are established, for example, the intermediate and high speed gear trains.

Switch 50 is in series with a foot-throttle-operated switch 55 having contacts 56 and 57 normally bridged by a contact 58 held up by a spring 59. When the throttle pedal is depressed a little beyond wide open position, the pedal will engage the rod 58a and cause the switch 55 to open, thereby rendering the overdrive inoperative.

Switch 55 is connected directly with resilient contact 62 of a governor or vehicle-speed-responsive switch 60. Switch 50 is connected directly with resilient contact 61 of switch 60. Contacts 61 and 62 are engaged respectively by contacts 63 and 64 mounted on a grounded vane 65 pivoted at 66 and normally held in circuit-open position against a stop 67 by a spring 68. The vane 65 is located in the path of an air current represented by arrow 69 and caused to impinge upon vane 65 by the vehicle-engine cooling fan 70. Contacts 62, 64 close at some moderate vehicle speed, for example 25 M. P. H., and remain closed above that speed. Due to lag in operation of the governor switch 60, the contacts 62, 64 will open at a speed slightly below 25 M. P. H., for example just below 22 M. P. H. At a relatively high vehicle speed, for example 55 M. P. H., contacts 63, 61 close and remain closed above that speed, thus nullifying the functioning of switch 55 to open control circuit from 46a to ground.

Switch 80 comprises a vacuum chamber 81 connected by pipe 81a with the engine intake manifold. Chamber 81 has a flexible wall or diaphragm 82 attached by a rod 83 to a contact 84 urged downwardly by spring 85 against a stop 86. The spring 85 is calibrated so that when the vehicle is running with nearly closed throttle above 9 M. P. H., in high gear, contacts 87 and 88 will be bridged by member 84 due to high vacuum. When the vehicle speed is brought below 9 M. P. H., with the above mentioned gear and throttle settings, the force of spring 85 will predominate to separate member 84 from contacts 87, 88.

Switch 90 comprises stationary contacts 91 and 92 normally bridged by contacts 93 held by spring 94. A rod 95, attached to contact 93, is located in the path of movement of the clutch operating pedal 96 pivoted at 97. Contact 91 is connected by wire 89 with contact 88 of switch 80. Contact 92 is grounded. The normal use of the clutch pedal 96 in connection with gear shifting does not open switch 90. To open switch 90 the driver must press pedal 96 beyond normal required for gear shifting and to the extent which obtains when the driver suddenly presses the clutch and brake pedals for a quick stop in traffic. The opening of switch 90 causes relay holding coil 48 to be deenergized so that the transmission may come out of overdrive although switch 80 may be closed. The advantage of clutch pedal control of relay 41 will be apparent from a detailed description of the mode of operation of the system.

In the present system, when the regular vehicle transmission is in high gear and when the vehicle has reached a certain moderate speed, for example 25 M. P. H., switch 50 will be closed and contacts 62, 64 of switch 60 will be closed. The relay armature attracting coil 46 will be energized to effect closing of relay contacts 42, 43 whereupon the solenoid 40 will be energized to effect downward movement of pawl 20 to cause the overdrive to be rendered operative. The rendering of the overdrive inoperative is under the control of the driver until the speed of the vehicle is, for example 55 M. P. H. Between 25 M. P. H. and 55 M. P. H. the driver can cause the transmission to come out of overdrive by depressing the throttle pedal a distance slightly beyond wide open throttle position thereby opening switch 55 which breaks the circuit of relay armature attracting coil 46. The act of depressing the throttle pedal for this purpose causes the engine intake vacuum to fall below the amount required to hold switch 80 closed. Therefore, the relay armature holding coil 48 will be deenergized while the coil 46 is deenergized. Relay 41 will open and solenoid 40 will be deenergized to allow spring 22 to lift the pawl 20 from the sungear locking ring. Then the overdrive will be rendered inoperative. After the engine has been accelerated, overdrive is restored when the driver quickly releases pressure upon the throttle pedal to cause switch 55 to close and to obtain a reversal of sun gear rotation which in turn causes the solenoid urged pawl to lock the sun gear.

Above 55 M. P. H. for example, contacts 61 and 63 of switch 60 are closed and the transmission remains in overdrive regardless of the use of the throttle pedal to accelerate since switch 55 has been by-passed by switch 60 when its contacts 61 and 63 are closed. This feature is desirable while driving in the higher range, because there is no need of dropping back into normal drive when accelerating in this driving range since the speed torque performance of the engine is suited to the overdrive gear ratio.

In overdrive control systems now in use, normal drive is automatically restored when the vehicle speed falls appreciably below a certain moderate speed, for example 22 M. P. H. There is nothing the driver can do to maintain overdrive below the opening speed of the governor switch. The system of my present invention provides for keeping the transmission in overdrive although the vehicle speed may fall to a low value, such as 9 M. P. H., for example, provided the driver does not depress the throttle pedal and cause the engine intake vacuum to diminish below that required to maintain switch 80 closed. After the vehicle transmission has gone into overdrive at a speed of 25 M. P. H., the vehicle speed may fall substantially below 25 M. P. H., but the overdrive will be maintained if the engine vacuum is not materially reduced since holding coil 48 of relay 41 remains energized and the relay 41 remains closed until the vacuum is reduced to a predetermined value. This feature is advantageous especially when descending a steep hill in gear since the engine is effective as a brake only when the transmission is in overdrive. In present overdrive systems the car "free wheels" when not in overdrive, even for any forward gear setting. In my present control system the overdrive will remain operative so long as the driver desires to use the engine as a brake, even though the driver should shift to second or even to first speed. Obviously, after the steep descent has been made, the driver will wish to accelerate again. The act of depressing the throttle pedal to accelerate will reduce the vacuum. Switch 80 will open; coil 48 will be deenergized; relay 41 will open; solenoid 40 will be deenergized; and normal drive will be restored.

The following is a detailed description of how various driving conditions are met by the present overdrive control system.

If the car is going down hill at a speed of 25 M. P. H. or above, the governor switch contacts 62, 64 will be closed and overdrive with engine braking is available, assuming that the foot has been lifted from the accelerator pedal. This is true because coil 46 holds the solenoid circuit closed. Coil 48 also is excited due to the high vacuum holding switch 80 closed. Under this condition both coils of the relay 41 are operative to hold the solenoid circuit closed. Should the driver apply the brakes and bring the car speed below 22 M. P. H., switch 60 will open and winding 46 will be deenergized, leaving only winding 48 to hold the solenoid circuit closed. Thus the car will remain in overdrive with engine braking effective as the speed is brought down lower and lower as may be desired. If the car speed should be brought down to about 9 M. P. H., the vacuum will be too low to hold the switch 80 closed, and the solenoid will be deenergized, thus taking the car out of overdrive.

If the descent of a hill is being made at a speed below 22 M. P. H., and the driver shifts to second gear in the usual way, viz (a) disengages clutch, (b) shifts gears, (c) removes foot from clutch pedal, the car will remain in overdrive because the vacuum will not drop enough to break the circuit through the holding coil 48. The foregoing assumes that the hill was approached with the car already operating in overdrive. Thus safe performance is obtained in descending a hill when operating either in third or second gear. As long as the throttle is not suddenly opened, the vacuum will not drop enough to open switch 80, hence the holding coil 48 of the relay 41 will keep the relay contacts closed and the solenoid energized. This holds true until the car is brought down to about 9 M. P. H. for third gear or 5½ M. P. H. for second gear.

Acceleration from any speed below 22 M. P. H. will be accompanied by a drop in vacuum sufficient to open switch 80 which in turn would cause the car to revert to conventional drive. Regardless of either second or third gear setting while decelerating in overdrive as described above, rapid acceleration is immediately available by suddenly opening the throttle. In general, it may be stated that the car is accelerated in conventional gear, making use of high torque, and it is decelerated in overdrive gear, making use of engine braking. The foregoing description of acceleration is for speed increase from the lower speed range, below about 25 M. P. H. When acceleration in conventional drive from points above 25 M. P. H. is desired, it is necessary to press down the accelerator pedal beyond wide open throttle position in a quick manner in order to open switches 55 and 80 to completely deenergize the relay 41 so the solenoid will drop out, thus taking the car out of overdrive.

To go back into overdrive, the foot is lifted quickly from the accelerator pedal. This closes switch 55, energizes the solenoid and also slows down the engine, causing the solenoid operated pawl 20 to lock the gears in overdrive setting. Lifting the foot quickly is necessary when climbing a grade, but when on a level road it may be lifted more slowly.

When the governor switch 60 is an air switch operated by air current from the engine cooling fan, if it is set to close at 25 M. P. H. car speed with the transmission in third gear or "high," the air switch will close at 15 M. P. H. car speed with the transmission in second gear or "intermediate," and will close at 9 M. P. H. car speed with the transmission in first gear or "low." Assuming that the car has been brought up to 15 M. P. H. or above, in second gear, the contacts 62, 64 of switch 60 would close and cause the solenoid to close to overdrive position, ready for the car to go into overdrive if and when the throttle is quickly closed an appreciable amount. Now, if, without releasing the accelerator pedal to go into overdrive, the next step is to shift to third gear in the normal manner, the following will happen:

(a) Clutch disengaged,
(b) Accelerator pedal released,
(c) Shift to third gear,
(d) Clutch re-engaged,
(e) Accelerator pedal pressed down for further speed increase.

The effect of (a) is to prevent slowing down of the sun gear and reversal of same. Therefore, after operation (a) the solenoid pawl has not placed the car in overdrive.

The effect of (b) is to raise the vacuum, close switch 80, excite holding coil 48. Also a coincident effect is to drop the engine speed to idle value thus causing air switch 60 to open. The combined result is that coil 48 is excited before switch 60 opens and the solenoid will remain operative for its overdrive position, however the car would not be in overdrive because the clutch is still disengaged.

Operation (c) makes no change in solenoid position nor in the gear setting, therefore the solenoid is still operative for overdrive but the car is not in overdrive.

The effect of (d) is to slow down the sun gear, and if at this time the engine is idling at 11 M. P. H. or below, the car will go into overdrive and be held there because holding coil 48 is still excited through the closed vacuum switch 80.

The effect of operation (e) is to give one or the other of two results depending on whether the accelerator pedal is pressed down quickly or slowly. If the throttle opening is made slowly, the vacuum would not drop sufficiently to open switch 80 and hence drop out the relay and solenoid. This will keep the car in overdrive and a moderate rate of acceleration will be effected. This would meet the driver's expectation because if he had wanted fast acceleration he would have pressed the accelerator pedal down quickly. If a quick throttle opening is made, coil 48 will be deenergized through opening of switch 80 as a result of low vacuum, and the solenoid would drop out, thus taking the car out of overdrive. This would happen before the car would reach 25 M. P. H., at which speed switch 60 will close and recondition the solenoid to overdrive position. This will result in fast acceleration in conventional third or "high" gear. The car could thereafter be placed in overdrive if and when the driver quickly closes the throttle as previously described.

The above describes acceleration through second and third gears from speeds below 25 M. P. H. When acceleration in conventional drive in third gear, from points above 25 M. P. H. and below 55 M. P. H., is desired, it is necessary to press the accelerator pedal beyond wide open throttle position in a quick manner in order to open both switches 55 and 80 to completely deenergize the solenoid relay to take the car out of overdrive.

When the throttle is quickly but momentarily closed an appreciable amount, as previously described, the car will revert to overdrive in third or "high" gear. The switch 55 closes immediately upon the first part of throttle closure and the reverting to overdrive follows with further momentary quick closure of the throttle.

When dropping down in car speed through 25 M. P. H. in third or "high" gear with the overdrive operating the switch 60 will open at approximately 22 M. P. H.; but, due to a partially closed throttle, switch 80 will be held closed and coil 48 will hold the solenoid in overdrive position. This solenoid position will be held until the car speed is brought down to about 9 M. P. H., at which speed the vacuum will be sufficiently low, even with partially open throttle, to cause switch 80 to open, resulting in the car reverting to conventional drive.

If the driver should be going down a long hill and decide, after switch 60 has opened to shift to second gear for safety, the car would be in overdrive at the start (held in by coil 48) and disengaging the clutch would not change this status; neither would shifting to second gear change it, therefore, when the clutch is reengaged, the car will be in overdrive with engine braking available.

After descending a hill in either second or third gear in overdrive, using engine braking, the driver may step on the accelerator pedal quickly and immediately revert to conventional drive for fast acceleration. The drop in vacuum opens switch 80 which breaks the circuit through the relay holding coil 48.

If the clutch operated switch 90 were not in the circuit and if the driver should disengage the clutch and hold it disengaged while he brings the car to a stop with the brake, the switch 80 would not open and holding coil 48 would keep the solenoid operated pawl in overdrive position. This is due to high vacuum while engine idles. This method of stopping occurs in traffic and at stop lights. The gear lever may be shifted to neutral or to any forward gear and still the solenoid would have the gears set for overdrive. When starting in the usual manner, the gears would revert to conventional setting if the throttle is opened quickly or slowly, because the vacuum would drop enough to open switch 80. If it became necessary to back up, difficulty might be experienced with the car still in overdrive. Therefore, the switch 90, operated by full movement of the clutch pedal 96, has been placed in the circuit to disconnect coil 48 when the driver stops the car with the brake pedal while, at the same time, depressing the clutch pedal to the limit of its travel. This results in taking the car out of overdrive so that reversal of movement of the car may be obtained through the conventional drive.

If the driver were to stop the car from a speed high enough to have placed the gears in overdrive position, and if the stopping were done with both clutch and brake pedals pressed down, but if the clutch pedal were not depressed sufficiently to open switch 90, and if the driver were to leave the car and to shut off the ignition, the gears would revert to conventional setting when the engine vacuum is reduced, because switch 80 would open and, the clutch being disengaged, there would be no side pressure to resist withdrawal of the overdrive pawl.

If, after stopping as described above, the driver should kill the engine by reengaging the clutch, this would immediately drop out the relay and solenoid and coincident with this there would be a jerk in the car which would permit withdrawal of the overdrive pawl, the latter being spring biased to conventional drive position.

Figure 2:
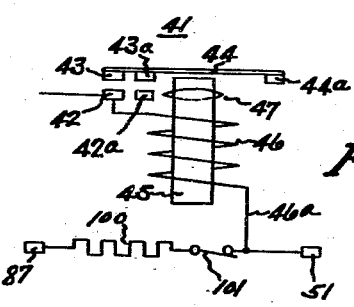
Fig. 2 is a fragmentary diagram illustrating a modification of the diaphragm shown in Fig. 1.

In the modification represented by Fig. 2, the holding coil 48 has been eliminated, and the contact 87 of switch 80 is connected by a resistance 100 and a manually operated switch 101 with wire 46a which connects coil 46 with contact 51 of switch 50. If, after energizing coil 46 to cause contacts 42, 43 to close, switch 60 is opened while switches 80 and 90 remain closed, coil 46 will remain connected with battery 44 through resistance 100 and switches 80 and 90. Resistance 100 will allow sufficient current to pass through coil 46 to enable it to act as an armature holding coil (same function as coil 48 of Fig. 1) and the relay 41 will remain closed until either switch 80 or 90 is opened. Resistance 100 is high enough to prevent closing of relay 41 until closed by the completion of the circuit which includes the switches 50, 55 and 60.

Switch 49 is provided in the system of Fig. 1 and switch 101 is provided in the system of Fig. 2 so that, when the driver desires to free wheel, these switches are opened to prevent the relay 41 from remaining closed after switch 55 or 60 is opened.

From the foregoing description of the construction and mode of operation of my new system of overdrive control it is apparent that I have provided for:

(a) Overdrive cut-in automatically at 25 M. P. H.

(b) Overdrive take-out manually below 55 M. P. H.

(c) Overdrive stay-in at 55 M. P. H. or greater, regardless of the position of accelerator pedal.

(d) Overdrive stay-in down to as low a 9 M. P. H., unless the vehicle is accelerated.

While I have stated certain speeds by way of example, it should be understood that my invention is not limited to certain stated speeds but that it can apply to other speeds which may be required. 25 M P. H. is merely typical of a very moderate driving speed. 55 M. P. H. is merely typical of some speed in the higher range. I contemplated this higher speed as being something like 60–65% of the top speed. 9 M. P. H. is merely typical of some very low speed. It could be any speed low enough for all practical purposes.

While the embodiments of the present invention as herein disclosed, constitute preferred forms, it is to be understood that other forms might be adopted, all coming within the scope of the claims which follow.

What is claimed is as follows:

1. An overdrive control system comprising a current source, a pawl for engaging the locking ring of the sun gear of an overdrive, a solenoid for moving the pawl, means responsive to a predetermined vehicle speed for connecting the current source with the solenoid and means responsive to engine intake vacuum for maintaining but not establishing the connection between the current source and the solenoid although vehicle speed may fall substantially below said predetermined vehicle speed.

2. An overdrive control system comprising a current source, a pawl for engaging the locking ring of the sun gear of an overdrive, a solenoid for moving the pawl, means responsive to a predetermined vehicle speed for connecting the current source with the solenoid, means responsive to a predetermined accelerator pedal position for disconnecting the solenoid from the current source to obtain quick acceleration, and means responsive to engine intake vacuum for maintaining but not establishing the connection between the current source and the solenoid although vehicle speed may fall substantially below said predetermined vehicle speed, said last named means being inadequate to connect the current source to the solenoid, and also being rendered inoperative by quick opening of the engine throttle.

3. An overdrive control system comprising a current source, a pawl for engaging the locking ring of the sun gear of an overdrive, a solenoid for moving the pawl, means responsive to a predetermined moderate vehicle speed for connecting the current source with the solenoid, means responsive to a predetermined accelerator pedal position for disconnecting the solenoid from the current source to obtain quick acceleration, and means responsive to a predetermined higher engine speed for maintaining connection between the current source and the solenoid regardless of operation of the engine throttle.

4. An overdrive control system comprising a current source, a pawl for engaging the locking ring of the sun gear of an overdrive, a solenoid for moving the pawl, means responsive to a predetermined moderate vehicle speed for connecting the current source with the solenoid, means responsive to a predetermined accelerator pedal position for disconnecting the solenoid from the current source to obtain a quick acceleration, means responsive to engine intake vacuum for maintaining but not establishing the connection between the current source and the solenoid although vehicle speed may fall substantially below said predetermined vehicle speed, said last named means being rendered inoperative by quick opening of the engine throttle and means responsive to a predetermined higher engine speed for maintaining connection between the current source and the solenoid regardless of operation of the engine throttle.

5. An overdrive control system comprising a current source, a pawl for engaging the locking ring of the sun gear of an overdrive, a solenoid for moving the pawl, a solenoid control relay having an armature movable toward a magnet core for connecting the current source with the solenoid, and having an armature attracting coil and an armature holding coil, a switch responsive to a predetermined vehicle or engine speed for connecting the current source with the armature attracting coil, and a switch responsive to engine intake vacuum for connecting the current source with the armature holding coil whereby, if the armature has been attracted, it will be held in attracted position although vehicle or engine speed may fall substantially below said predetermined speed, provided a certain intake vacuum is maintained.

6. A system according to claim 5 having also a switch responsive to a predetermined travel of accelerator pedal for disconnecting the current source from the armature attracting coil, said vacuum switch opening the circuit of the armature holding coil in response to the quick opening of the engine throttle.

7. A system according to claim 5 having also a switch responsive to the position of the accelerator pedal for disconnecting the current source from the armature attracting coil, said vacuum switch opening the circuit of the armature holding coil in response to the quick opening of the engine throttle and having a switch responsive to a predetermined higher engine speed for maintaining the connection between the current source and armature attracting coil regardless of the opening of the engine throttle.

8. An overdrive control system comprising a current source, a pawl for engaging the locking ring of the sun gear of an overdrive, a solenoid for moving the pawl, speed responsive means for connecting the current source with the solenoid, and mean adequate to maintain the solenoid circuit in closed condition but inadequate to close said circuit, said last named means being responsive to engine intake vacuum.

9. An overdrive control system comprising a current source, a pawl for engaging the locking ring of the sun gear of an overdrive, electromagnetic means for moving the pawl, engine speed responsive means for connecting the current source with the electromagnetic means, and means adequate to maintain the circuit to the electromagnetic means in closed condition but inadequate to close said circuit, said last means being responsive to intake vacuum.

10. An overdrive control system comprising a current source, a pawl for engaging the locking ring of the sun gear of an overdrive, a solenoid for moving the pawl, a solenoid control relay having an actuating coil with one end connected to the current source terminal and the other end connected to a control terminal; said control terminal being attached to two control circuits, the first of which comprises an air operated switch, for an engine speed responsive means, and a plurality of other switches, all connected in series relation between said control terminal and ground side of the current source, and the second control circuit comprising a vacuum responsive switch, a clutch operated switch, a manually operated switch and also a resistor unit, all connected in series relation between said control terminal and ground side of current source.

11. A system according to claim 10 having also a slow drop out feature of the relay armature, the timing being in the order of .25 second from the deenergization of the holding or closing coil until said armature moves away from the core.

EDWARD M. CLAYTOR.